Nov. 15, 1927.  
W. L. MARDEN  
STUFFING BOX  
Filed Dec. 16, 1926  
1,649,314
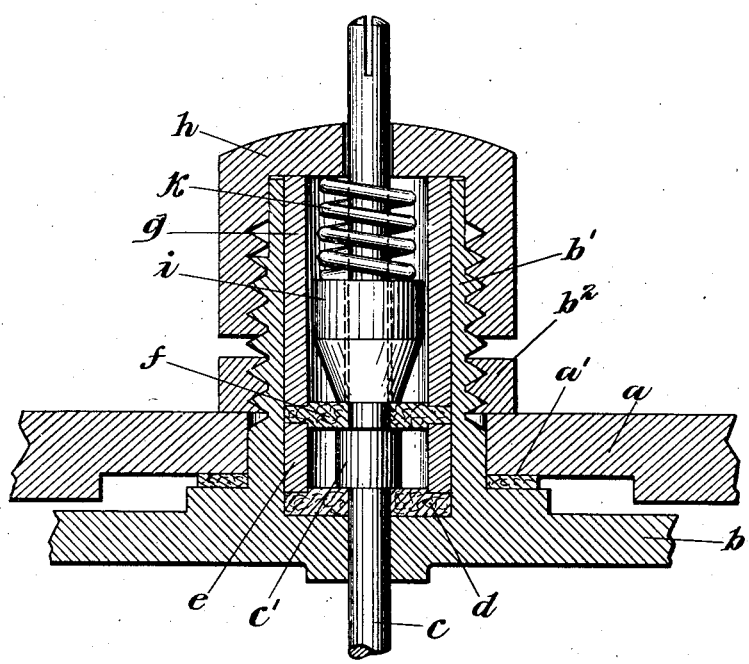
Inventor  
William L. Marden  
By his Attorneys  
Redding, Greeley, O'Shea & Campbell Patented Nov. 15, 1927.

1,649,314

UNITED STATES PATENT OFFICE.

WILLIAM L. MARDEN, OF ELMHURST, NEW YORK, N. Y., ASSIGNOR TO NEPTUNE METER COMPANY, OF NEW YORK, N. Y., A CORPORATION OF NEW JERSEY.

STUFFING BOX.

Application filed December 16, 1926. Serial No. 155,274.

The stuffing box which forms the subject of the present invention was designed with particular reference to its application to the transmitting shaft of water meters, by which the movement of the nutating disc or other actuating part is transmitted to the registering devices, which are usually mounted on the top of the meter casing. It is desirable in such uses to create as little drag as possible on the transmitting shaft and yet to prevent effectually the leakage of water or other liquid being metered from the casing. The special advantages secured by the improved construction are the provision of means whereby constant tension can be maintained on the stuffing box, the provision of means whereby the tension on the stuffing box can be varied to suit different conditions of use and the provision of means whereby wear is taken up automatically in the long continued use of such devices, the construction being such, moreover, that all of the working parts can be submerged in oil to the exclusion of water or other liquid and prevention of corrosion. Although the invention has been developed with reference to the particular use mentioned, it will be evident that the advantages of the improved construction are capable of realization in other uses.

The invention will be more fully explained hereinafter with reference to the accompanying drawing, the single figure of which is a view in sectional elevation of a stuffing box which embodies the invention.

In the drawing the meter casing is represented at $a$ and at $b$ is indicated a plate which is placed within the meter casing and carries an exteriorly threaded and interiorly chambered boss $b'$ which is projected upward through a suitable aperture in the casing $a$. A packing ring $a'$ is interposed between the casing and the plate and a nut $b^2$ threaded on the boss $b'$ serves to make a tight joint between the casing and the plate. As thus far described, the construction is a matter of convenience and so far as the present invention is concerned, the plate $b$, with its exteriorly threaded and interiorly chambered boss $b'$ may be regarded as the equivalent of the meter casing or other supporting member.

The transmitting shaft $c$ is projected through the plate $b$ and within the chamber of the boss $b'$ is shouldered, preferably being formed with a solid collar $c'$. Within the chamber of the boss $b'$ and at the bottom thereof is a washer $d$ of any suitable material, having a free working fit about the shaft $c$, the shoulder formed at the lower end of the collar $c'$ resting on the washer. Upon the washer $d$ is superimposed a sleeve $e$ which fits freely within the chamber and forms a chamber about the collar $c'$. A second washer $f$ is superimposed on the sleeve $e$ and has a free working fit about the shaft, resting upon the shoulder formed at the upper end of the collar $c'$. A second sleeve $g$ fitted loosely within the chamber of the boss $b'$, rests upon the washer $f$ and is preferably extended slightly above the upper end of the boss $b'$ for contact with a cap $h$ which is threaded on the boss $b'$ and has a loose fit on the shaft $c$.

Loose on the shaft $c$ within the chamber of the boss and resting on the washer $f$, is a collar $i$ and between this collar and the top of the cap $h$ is interposed a spring $k$ which bears at its lower end upon the collar $i$ and presses it down upon the washer $f$, the pressure being transmitted in some degree through the washer to the solid collar $c'$ and through it upon the washer $d$.

It will be seen that through the threaded cap $h$ the sleeves $e$, $g$ and the washers $d$, $f$ are held together under a constant pressure which can be varied to suit different conditions of use and that through the pressure of the spring $k$ on the loose collar $i$ wear is compensated for automatically and a proper degree of pressure between the shoulders on the shaft and the washers is maintained at all times. When the stuffing box is assembled, the chambers within the boss $b'$ are preferably filled with oil to exclude water or other liquid from the working parts of the stuffing box and prevent corrosion.

It will be understood that various changes in details of construction and arrangement can be made to suit different conditions of use and that, except as pointed out in the accompanying claim the invention is not restricted to the precise construction shown and described herein.

I claim as my invention:

In a stuffing box, the combination of a plate having a chambered boss, a shouldered shaft extended through the chambered boss and having a solid collar to form shoulders, a washer carried at one end of the chamber and having one of the shoulders of the collar bearing thereagainst to form a thrust bearing for the shaft, a second washer coacting with the other shoulder of the collar, a sleeve fitted within the chamber and between the washers, a second sleeve bearing against the outer face of the second washer, and means coacting with the boss to maintain the parts in contact under pressure.

This specification signed this 14th day of December, A. D. 1926.

WILLIAM L. MARDEN.